United States Patent [19]

Willing

[11] Patent Number: 4,959,804

[45] Date of Patent: Sep. 25, 1990

[54] PARAMETER MEASURING APPARATUS

[75] Inventor: Richard S. Willing, Granada Hills, Calif.

[73] Assignee: Baxter International Inc., Deerfield, Ill.

[21] Appl. No.: 217,806

[22] Filed: Jul. 12, 1988

[51] Int. Cl.$^5$ ............................ G01K 7/00; G06F 15/20
[52] U.S. Cl. ..................................... 364/557; 364/556; 374/101; 374/104; 307/116; 324/105
[58] Field of Search ..................... 364/557, 550, 556; 307/116, 118, 39; 324/105; 374/100, 101, 104

[56] References Cited

U.S. PATENT DOCUMENTS

| | | | |
|---|---|---|---|
| 4,209,837 | 6/1980 | Brown | 364/557 |
| 4,288,853 | 9/1981 | Uesugi | 364/557 |
| 4,369,352 | 1/1983 | Bowles | 219/413 |
| 4,413,325 | 11/1983 | Elfner et al. | 364/557 |
| 4,455,095 | 6/1984 | Bleiker | 374/39 |
| 4,480,312 | 10/1984 | Wingate | 364/557 |
| 4,531,526 | 7/1985 | Genest | 128/630 |
| 4,562,554 | 12/1985 | Stixrud et al. | 364/557 |
| 4,575,806 | 3/1986 | Aldrich et al. | 364/557 |
| 4,629,336 | 12/1986 | Ishizaka | 364/557 |
| 4,634,292 | 1/1987 | Ikeda et al. | 374/109 |
| 4,642,785 | 2/1987 | Packard et al. | 364/557 |
| 4,682,279 | 7/1987 | Watabe | 364/557 |
| 4,713,783 | 12/1987 | Fletcher | 364/557 |
| 4,755,958 | 7/1988 | Mizuhara | 364/557 |
| 4,771,393 | 9/1988 | Ishida et al. | 364/557 |

Primary Examiner—Parshotam S. Lall
Assistant Examiner—Brian M. Mattson
Attorney, Agent, or Firm—Kay H. Pierce; Paul C. Flattery; Bradford R. L. Price

[57] ABSTRACT

A parameter measuring apparatus includes a constant signal circuit incorporating a sensor having a known response to a given parameter for outputting a signal representing the parameter. The constant signal circuit further includes circuitry defining upper and lower limits of the parameter range. The parameter signal is provided to a sampling device such as current-to-frequency converter for providing an analog-to-pulse converted signal to a microprocessor. The apparatus further includes a switching arrangement coupled to and controlled by the microprocessor for switching into circuit the sensor or the circuitry defining the upper or lower parameter limits. The switching arrangement also eliminates internal switch resistance in the circuit for improved measurement accuracy. With the known response of the sensor as well as known regression analysis correction calculations stored in the microprocessor, the microprocessor outputs a corrected parameter signal which accurately represents the measured parameter regardless of variation in circuit operation due to changes in operating conditions.

16 Claims, 2 Drawing Sheets

PARAMETER MEASURING APPARATUS

BACKGROUND OF THE INVENTION

The present invention relates to an apparatus for the measurement of a parameter which can be transduced using a resistively varying transducer element. One example of a parameter which is amenable to measurement using the present invention is temperature which may be transduced and measured by electrically sensing the resistance of a thermally sensitive device, such as a thermistor. Some other examples of parameters similarly amenable to measurement using the present invention are load (tension, weight, or pressure), pH, humidity, light intensity, or displacement (position).

Parameter measuring apparatuses can be used in a wide variety of areas in industry, as well as in consumer goods. For example, a temperature measuring apparatus may be used to measure the heat present in a motor, the heat present in a room, or the heat present in other systems, the output of which temperature measuring apparatus may be used in a feedback or other control circuit to control the heat source, and thereby maintain a constant temperature at the point of temperature measurement in the particular system involved.

Apparatuses for measurement of parameters are widely utilized and known in the prior art. Specifically, for example, temperature measuring apparatuses utilizing digital electronic circuitry, as in the present invention, are known in the art, as represented by Elfner et al., U.S. Pat. No. 4,413,325 for "An Apparatus for Determining the Temperature of an Asynchronous Motor"; Blieker, U.S. Pat. No. 4,455,095 for "A System for Measuring the Heat Energy (mission of Room Heating Elements"; Ikeda et al., U.S. Pat. No. 4,634,292 for "An Electronic Thermometer"; and Packard, et al., U.S. Pat.No. 4,642,785 for "A Cordless Electronic Thermometer". All of the above listed patents employ the use of an analog-to-digital conversion to convert an analog temperature sensor output to a form which is usable by digital electronic circuitry.

Wingate, U.S. Pat. No. 4,480,312 for "A Temperature Sensor/Controller System", uses a voltage-to-frequency converter to convert the analog output of a temperature sensor to a form usable by a microcomputer in digital electronic circuitry, as does the present invention.

The present invention is usable in a wide of variety of applications but was primarily developed for use in medical systems such as temperature measurement and control of heating pads, heating mattresses, cooling mattresses, and the like.

The various electronic components used in temperature measuring systems, such as temperature sensors, voltage or current sources, and the like, often may vary in their response as voltage applied to them varies, as the ambient temperature in which they operate varies, or for some other reason, such as excessive humidity or the like.

Generally speaking, precision in a measurement device is achievable at the expense of an increased cost of components used to construct the system. Many systems seek to provide a precision voltage or current source in order to insure that the response of the various components within the system is stable in the environment in which it is to be used. This is the approach taken in the Wingate invention. Wingate employs a precision voltage reference to insure that the supply voltage for his system is precisely controlled.

The present invention is designed to provide a precision parameter measuring apparatus, such as a temperature measuring apparatus, which is reliable in its operation to a high degree of accuracy over a wide variety of operating conditions which may be encountered in use. The present invention achieves such stable operation using stable passive reference components and microprocessor calculating capabilities, rather than relatively expensive stable signal source circuitry, to reliably and accurately measure and indicate temperature in spite of destabilizing influences such as variance of supply voltage, variance of ambient temperature, variance of ambient humidity, or the like.

SUMMARY OF THE INVENTION

The invention is an apparatus for measurement of a parameter which can be transduced using a resistively varying transducer element. One example of a parameter amenable to such transducing is temperature. The invention provides an output signal indicative of the temperature measured, which output signal, according to the preferred embodiment of the invention, is accurate within very tight tolerances in spite of wide variance in destabilizing influences such as ambient temperature or supply voltage or even wider variances due to component manufacturing tolerance. The latter category may include, for example, the conversion sensitivity of a voltage-to-frequency converter, the offset, bias or gain variations of operational amplifiers, or any other parameter variations occurring within the circuitry used in this invention whether present at the time of initial manufacture or occurring during subsequent use. In fact, it is a further advantage of the present invention that no adjusting devices typically found in precision measuring devices, such as potentiometers or rheostats, need be provided, and that the absence of such adjusting devices can actually add materially to the stability of an apparatus using this invention as well as reducing its cost.

The parameter measuring apparatus of the present invention utilizes an inexpensive constant current circuit which produces an output which is constant for a given time, but may vary over the life of employment of the apparatus, and a sensor means responsive to the output of that constant current circuit. The sensor means senses and indicates the parameter to be measured and has a known response to that parameter over a measured range, which range has a high and low parameter limit. The preferred embodiment of the apparatus is adapted to measure temperature and employs a plurality of stable passive reference resistors which are responsive to the output of the constant signal circuit to establish real-time system reference indications of at least the high temperature and low temperature limits of the temperature range of the sensor device.

During operation of the present invention, the parameter sensor, the high parameter limit reference element, and the low parameter limit reference element are selectively individually connected by a switching means to a sampling device which, in the preferred embodiment is a current-to-frequency converter. The sampling device provides an output in the form of a frequency which is representative of the indication sample which, in turn, represents the sensor element or reference element connected to the sampling means.

The output of the sampling means is applied to a microprocessor. The microprocessor has stored therein the known response of the sensor element and uses that known response, together with the indications from the sampling means of the high parameter limit reference element and the low parameter limit reference element indications currently extant to calculate, by known regression analysis computation, a correction to the measured parameter to produce a true measured parameter indicating signal as an output. The true measured parameter indicating signal is compatible for use in a control system, as described generally above.

In the preferred embodiment, the microprocessor also controls the switching element which effects the selective connection of the sensor means or selected of the parameter limit reference means to the sampling means.

It is therefore an object of this invention to provide a parameter measuring apparatus which will produce a precise real time indication of a measured parameter despite a wide variance of operating conditions.

It is a further object of this invention to provide a parameter measuring apparatus capable of providing a precision indication of a measured parameter which is economical to manufacture and reliable in its operation.

Further objects and features of the present invention will be apparent from the following specification and claims when considered in connection with the accompanying drawings illustrating in the preferred embodiment of the invention.

DETAILED DESCRIPTION OF THE DRAWINGS

DETAILED DESCRIPTION OF THE INVENTION

Figure 1:
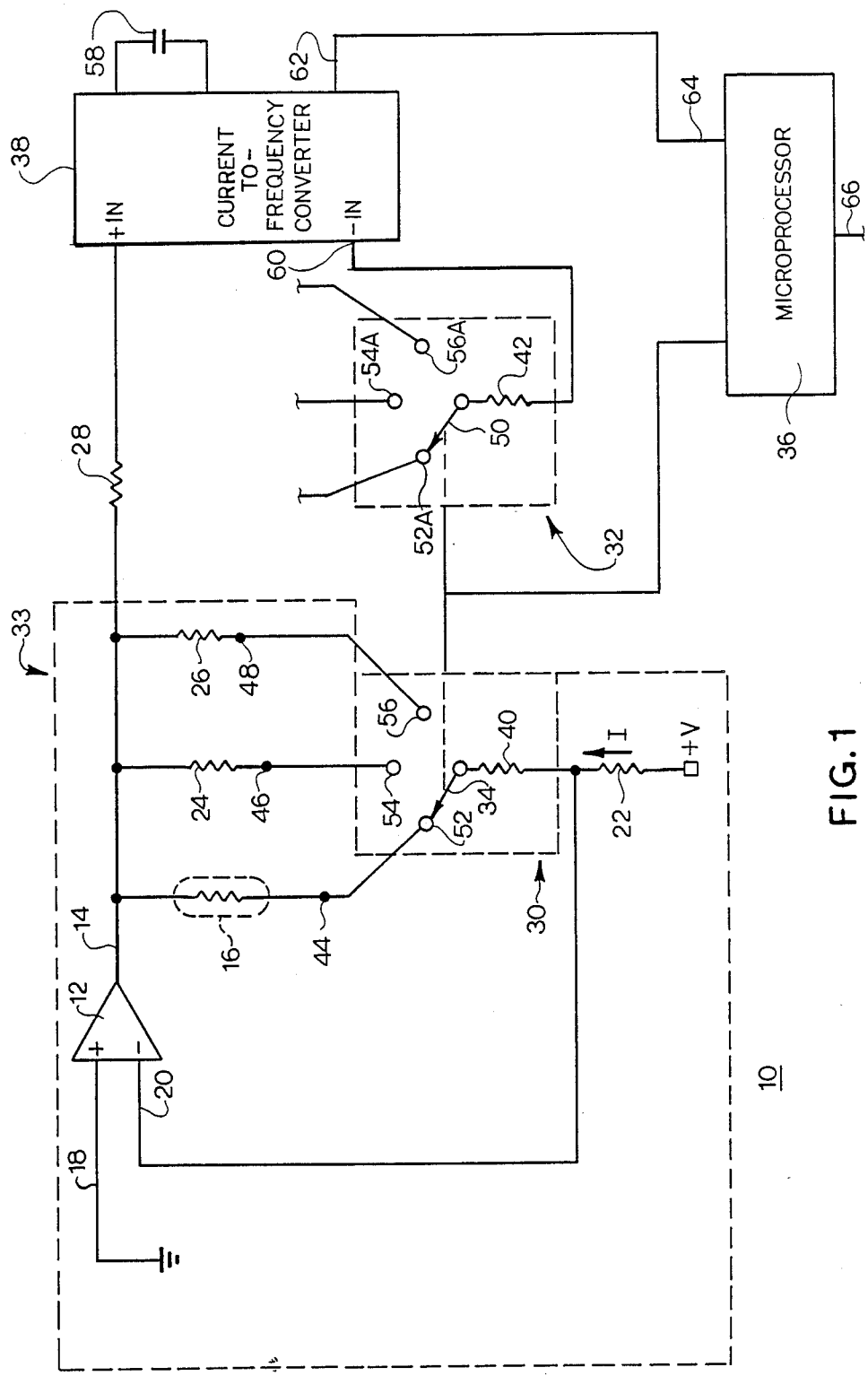
FIG. 1 is a schematic drawing of the preferred embodiment of the present invention.

The preferred embodiment of a parameter measuring apparatus is shown schematically as a temperature measuring apparatus 10 in FIG. 1. The temperature measuring apparatus 10 includes an operational amplifier 12 having an output 14 connected to a sensor such as a thermistor 16, to a resistor 24, to a resistor 26, and to a resistor 28. The resistors 24 and 26 and the thermistor 16 are connected to switches 30 and 32. Switch 30 selectively connects thermistor 16, or resistor 24, or resistor 26 to a voltage source +V through resistor 22, depending upon the position of the actuator 34 of switch 30.

Connection of the negative input 20 of the operational amplifier 12 to resistor 22, and connection of the positive input 18 of the operational amplifier 12 to ground, results in a constant current circuit 33 incorporating the operational amplifier 12; the resistor 22; and either the thermistor 16, the resistor 24, or the resistor 26 so that a constant current I is caused to flow through the particular element 16, 24, 26 included in the constant current circuit 33, as determined by the position of the actuator 34 of the switch 30. The value of the resistor 22 and the level of voltage source +V will determine the value of constant current I flowing through the constant current circuit 33 and, therefore, the resistor 22 is a current determining resistor.

The thermistor 16 is, in the preferred embodiment, a precision temperature-responsive device which will provide a predictable resistance variance according to the temperature it experiences. This temperature-resistance response of the thermistor 16 is stored in the memory of the microprocessor 36 for use in correction calculations, as shall be hereinafter described.

The temperature measuring apparatus 10 is designed to operate within a specific temperature range. For example, the range may span from 0 degrees centigrade (° C.) to 50 degrees centigrade (° C.). Resistor 24 is, in the preferred embodiment, designed to represent the high limit (e.g., 50° C.) of the response curve of the thermistor 16; the resistor 26 is designed to represent the low limit (e.g. 0° C.) of the thermistor 16. That is to say, the resistance presented by the resistor 24 in the presence of constant current I is designed to be the same resistance which would be presented to that current I by the thermistor 16 at the high limit of the temperature range under consideration, e.g. 50° C. Similarly, the resistor 26 is designed to present a resistance to the constant current I which is the same as a resistance which would be presented by the thermistor 16 to that current I at 0° C., the low limit of the temperature range under consideration. Accordingly, the resistor 24 may be referred to as the high limit reference resistor 24, and the resistor 26 may be referred to as the low limit reference resistor 26.

In the preferred embodiment of the invention, high limit reference resistor 24 and low limit reference resistor 26 are temperature-stable film resistors which reliantly produce the designed and desired resistance under a wide range of ambient temperatures, humidities, and other operational parameters.

The description of the current I as a "constant" current is intended to reflect the nature of the constant current circuit 33. Constant current I is constant over a finite period; it is not necessarily a "precision" current, nor is it necessarily a "stable" current. The constant current circuit 33 is susceptible to the influences of variances in ambient temperature, age, humidity, or the like, so it is an unstable current source from period to period. The speed of switching of switches 30, 32 in response to the microprocessor 36 ensures that, for the finite period of sampling required, the current I is sufficiently constant to yield the desired accuracy in measurement and indication of the measured temperature.

A sampling device, such as a current-to-frequency converter 38 is incorporated in the apparatus 10 in a manner whereby the current-to-frequency converter 38 samples the voltage across the thermistor 16, or high limit reference resistor 24, or low limit reference resistor 26, whichever of those elements 16, 24, 26 is selected by the switch 30. Resistor 28 is a scaling resistor so that the voltage across the selected element 16, 24, 26 is presented to the current-to-frequency converter 38 as a current, and is therefore recognizable by the current-to-frequency converter 38.

The switch 32 is included in the apparatus 10 in order to avoid the internal resistance presented by typical devices contemplated for use in the role of switching apparatus in the preferred embodiment of the invention. Specifically, the switch 30 has an internal resistance represented by resistor 40, and the switch 32 has an internal resistance represented by resistor 42 in FIG. 1.

If switch 32 were not incorporated in the circuit of FIG. 1, and current-to-frequency converter 38, through scaling resistor 28, were connected to read the voltage across the selected element 16, 24, 26, and the switch 30, then the internal resistance of the switch 30, represented by resistor 40, would be included in the circuit across which current-to-frequency converter 38, through scaling resistor 28, was measuring voltage. Thus, the voltage seen by current-to-frequency converter 38, through scaling resistor 28, would vary by the variance occasioned by the internal resistance of switch 30, represented by resistor 40, caused by any varying ambient conditions which may be present. In such a situation, the precision of the thermistor 16 or the temperature limit reference resistors 24 and 26 would be negated. It is cost prohibitive to provide a switch 30 with a stable internal resistance 40, and it is an unnecessary cost. Such degradation of the precision of elements 16, 24, 26 is avoided by connection of the sWitch 32 across thermistor 16 and temperature limit reference resistors 24 and 26, respectively at 44, 46 and 48. As can be seen in FIG. 1, the actuators 34 and 50 of switches 30 and 32 are controlled by the microprocessor 36 and are operated in tandem. Thus, when the switch 30 has its actuator 34 in a position contacting pole 52 to include thermistor 16 in the constant current circuit 33, the tandem operation of switch 32, as controlled by the microprocessor 36, connects actuator 50 of switch 32 to pole 52A, thereby presenting to current-to-frequency converter 38, through scaling resistor 28, the voltage across thermistor 16. Of course, the internal resistance 42 of switch 32 is included in the connection between thermistor 16 and current-to-frequency converter 38, through connection point 44, through pole 52A, and through actuator 50. However, the internal resistance 42 of switch 32 is of negligible consequence in such a configuration because the input impedance of the current-to-frequency converter 38 at connection pin 60 is extremely high in comparison to internal resistance 42. Thus, internal resistance 42 of switch 32 has a negligible impact upon the accuracy of the voltage seen by current-to-frequency converter 38 through scaling resistor 28. Moreover, the high lo impedance of the input of current-to-frequency converter 38 at pin 60 has a negligible effect upon the current I in the constant current circuit 33.

Positioning of the actuator 34 of switch 30 to contact pole 54 includes high limit reference resistor 24 in the constant current circuit 33. The movement of actuator 34 of switch 30 is effected simultaneously with tandem movement of the actuator 50 of switch 32 to contact pole 54A, thereby presenting the voltage across high limit reference resistor 24 to the current-to-frequency converter 38 through scaling resistor 28. Similarly, movement of the actuator 34 of switch 30 to contact pole 56 is effected simultaneously with tandem movement of the actuator 50 of switch 32 to contact pole 56A, thereby presenting the voltage across low limit reference resistor 26 to current-to-frequency converter 38 through scaling resistor 28.

The frequency output 62 of current-to-frequency converter 38 is determined by the scaling capacitor 58 so that the frequency output 62 can be compatibly adjusted to match the operating parameter capabilities of the microprocessor 36. The frequency output 62 is applied to an input pin 64 of the microprocessor 36. The microprocessor 36 is programmed to recognize the frequency output 62 at its input pin 64 as representative of the voltage readings across the thermistor 16, the high limit reference resistor 24, and the low limit reference resistor 26; to apply the frequency outputs 62 associated with the high limit reference resistor 24 and the low limit reference resistor 26 to fix the two ends of the temperature-resistance response curve of a theoretical thermistor 16 which is not affected by its environment. The frequency output 62 associated with the thermistor 16 is incorporated in regression analysis calculations by the microprocessor 36, and through such regression analysis calculation, the true temperature is calculated and indicated as an output at pin 66 of microprocessor 36 for further use in control circuitry (not shown).

Figure 2:
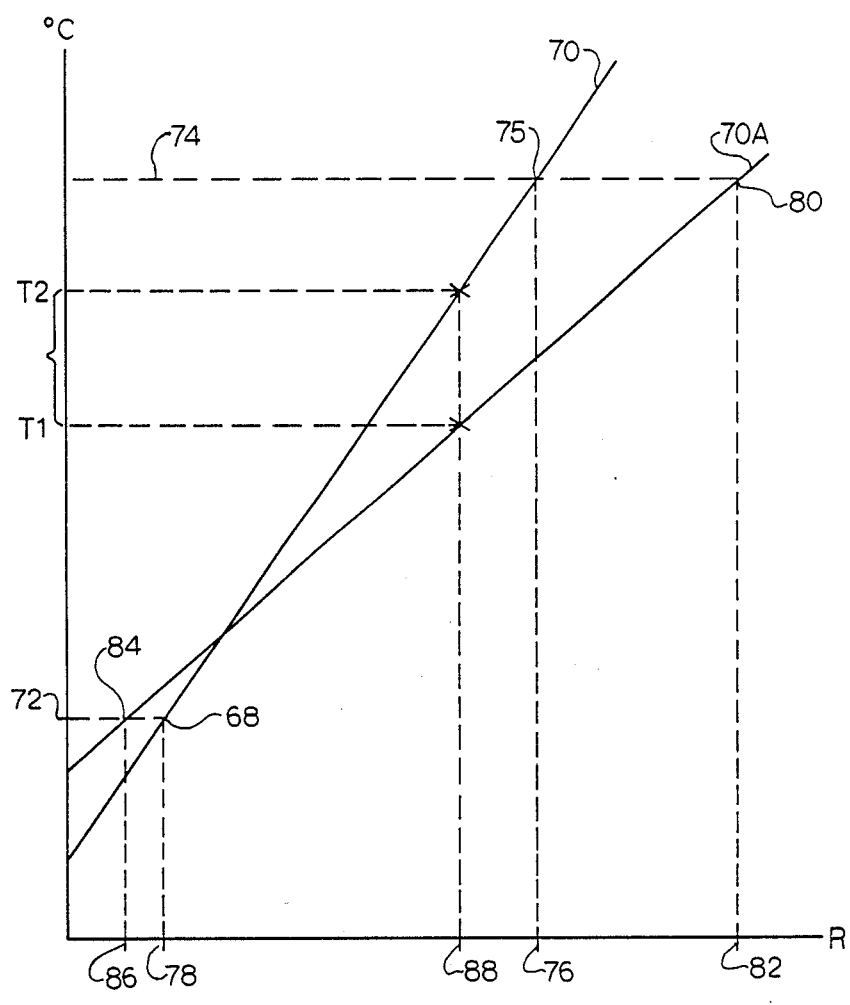
FIG. 2, is a simplified illustration of a response curve for a sensor element used in the preferred embodiment of the present invention.

In FIG. 2, a simplified graphic representation of a response curve for a thermistor 16 is presented showing a linear primary response curve 70 as an example of the theoretical response curve of a thermistor 16 in the circuit of FIG. 1 when the proper voltage +V is supplied to the constant current circuit 33, resulting in the proper current I flowing through the constant current circuit 33. Alternate response curve 70A in FIG. 2 is representative of an actual response curve of a thermistor 16 under conditions where the current I has varied due to either a variance in supply voltage +V because of a change in ambient temperature or a similar circumstance.

In FIG. 2, the upper temperature limit 74 of the anticipated operating range for the apparatus 10 of FIG. 1 intersects the primary response curve 70 at point 75. The corresponding high limit resistance reading associated with the intersection point 75 of upper temperature limit 74 with primary response curve 70 is found on the horizontal axis at point 76. It is the value of resistance indicated at point 76 which is chosen as the value of high limit reference resistor 24 in FIG. 1. The low temperature limit 72 of the anticipated operating range for the apparatus 10 in FIG. 1 intersects the primary response curve 70 at point 68, which yields a low limit resistance reading on the horizontal axis at point 78. It is the value of resistance indicated at point 78 which is chosen as the value of low limit reference resistor 26 in FIG. 1.

If the operating conditions change current I sufficiently to yield response curve 70A for thermistor 16 in FIG. 1, the upper temperature limit 74 intersects the alternate response curve 70A at point 80, thereby yielding an actual high limit resistance value for that actual current I readable at point 82 on the horizontal axis of FIG. 2. Similarly, the low temperature limit 72 of the anticipated operating range of the thermistor 16 in FIG. 1 intersects the alternate response curve 70A at point 84, yielding a corresponding actual low limit resistance readable at point 86 on the horizontal axis of FIG. 2.

Presuming that the apparatus 10 of FIG. 1 is operating in such conditions that the thermistor 16 has a temperature-resistance response represented by alternate response curve 70A in FIG. 2, the current-to-frequency converter 38 through scaling resistor 28 would read across high limit reference resistor 24 and low limit reference resistor 26, respectively, voltages corresponding to the resistances indicated at point 82 and point 86 on the horizontal axis of FIG. 2. The current-to-frequency converter 38 through scaling resistor 28 would also read a voltage across the thermistor 16 indicating the resistance reading at point 88 on the horizontal axis of FIG. 2. The resistance reading at point 88 on the horizontal axis of FIG. 2 corresponds to a temperature T1 on alternate response curve 70A, which is, in this example, the response curve of thermistor 16 under the actual operating conditions experienced by the apparatus 10 of FIG. 1. The actual temperature which should be read in order for the apparatus 10 of FIG. 1 to accurately reflect the measured temperature considered should be at T2, which is the temperature indicated by the resistance at point 88 on the horizontal axis of FIG. 2 in relation to the primary response curve 70. The offset on the vertical axis of FIG. 2 between temperature TI and temperature T2 is the error of the apparatus 10 of FIG. 1 occasioned by the adverse operating conditions which caused the current I to vary and, in turn, caused the shift of the response curve of the thermistor 16 from primary response curve 70 to alternate response curve 70A.

The present invention recognizes this source of error and stores in the microprocessor 36 a mathematical representation of the primary response curve 70 as well as regression analysis programs for recognizing an alternate response curve 70A and adjusting the alternate response curve 70A to fit the primary response curve 70. In such manner, the apparatus 10 of FIG. 1 reduces the error between temperature T1 and T2 to within acceptable variance.

It is to be understood that, while the detailed drawings and specific examples given describes a preferred embodiment of the invention, they are for the purpose of illustration only, but the apparatus of the invention is not limited to the precise details and conditions disclosed and that various changes may be made therein without departing from the spirit of the invention which is defined by the following claims.

I claim:

1. A parameter measuring apparatus comprising a constant signal means for providing a first constant output signal, said constant output signal means including sensor means for sensing and measuring a parameter and first and second stable passive reference means respectively defining a high parameter limit and a low parameter limit of said sensor means, wherein said sensor means has a known response to the parameter over a parameter range defined by said high parameter limit and said low parameter limit; sampling means coupled to said constant output signal means for sampling said first constant output signal means for sampling said first constant output signal and providing a second output signal; first switching means coupled to said constant signal means for selecting said sensor means or one of said passive reference means in said constant signal means; second switching means coupled to said constant output signal means and to said sampling means for minimizing an internal resistance of said first switching means and its effect upon the first constant output signal provided to said sampling means; and calculator mans coupled to said sampling means and responsive to said second output signal for storing and comparing said known response of said sensor means with said second output signal and calculating and providing a corrected output signal accurately representing the measured parameter, wherein said calculator means is operative to selectively actuate said first and second switching means for selectively coupling said calculator means to said sensor means and said first and second passive reference means.

2. The parameter measuring apparatus as recited in claim 1 wherein each of said stable passive reference means comprises a stable precision resistor.

3. A parameter measuring apparatus as recited in claim 2 wherein said constant signal means comprises a constant current circuit.

4. The parameter measuring apparatus as recited in claim 2 wherein said calculator means comprises a microprocessor apparatus and said calculation is a regression calculation.

5. The parameter measuring apparatus as recited in claim 2 wherein said parameter is temperature and said sensor means comprises a thermistor.

6. The parameter measuring apparatus as recited in claim 1 wherein said constant signal means comprises a constant current circuit.

7. The parameter measuring apparatus as recited in claim 1 wherein said sampling means samples voltage at a plurality of sample points between said high and low parameter limits, said sampling means comprising a scaling resistor and a current-to-frequency converter.

8. The parameter measuring apparatus as recited in claim 7 wherein said sampling means samples voltage at said sample points, said sampling means comprising a scaling resistor and a current-to-frequency converter.

9. A parameter measuring apparatus as recited in claim 1 wherein said calculator means comprises a microprocessor apparatus and said calculation is a regression calculation.

10. A parameter measuring apparatus as recited in claim wherein said parameter is temperature and said sensor means comprises a thermistor.

11. An apparatus for precisely measuring and producing a true indication of a parameter within a parameter range between a high parameter limit and a low parameter limit, the apparatus comprising a constant current source means for providing a constant current during operation of the apparatus; a sensor means coupled to said constant current source means and responsive to said constant current for sensing said parameter and providing a parameter indication signal representative of said parameter, said sensor means having a known resistance-to-parameter response over said parameter range; first and second parameter-stable reference resistor means responsive to said constant current for respectively providing high and low reference parameter indication signals; sampling means coupled to sensor means and said first and second parameter-stable reference resistor means for sampling said parameter indication signal and said high and low reference parameter indication signals and providing an output signal; first switching means coupled to said sensor means and to said first and second reference resistor means for selectively connecting said sensor means or one of said reference resistor means to said sampling means; microprocessor means coupled to said sampling means and responsive to said output signal and for storing data representing the known resistance-to-parameter response of said sensor means for comparing the output signal with the data representing the known resistance-to-parameter response over said parameter range of said sensor means for calculating an appropriate correction to apply to said parameter indication signal to produce a true parameter indication signal; and second switching means coupled to said sensor means and said first and second reference resistor means and to said sampling means for minimizing any effect of an internal resistance of said first switch means on aid parameter indication signal and said high and low reference parameter indication signals.

12. Apparatus as recited in claim 11 wherein said high and low reference parameter indication signals respectively represent said high and low parameter limits.

13. Apparatus as recited in claim 12 wherein said sampling means includes a scaling resistor and a current-to-frequency converter in combination.

14. Apparatus as recited in claim 12 wherein said sensor means comprises a thermistor.

15. Apparatus as recited in claim 11 wherein said sampling means includes a scaling resistor and a current-to-frequency converter in combination.

16. Apparatus as recited in claim 11 wherein said parameter is temperature and said sensor means comprises a thermistor.

* * * * *